United States Patent
Badiee

Patent Number: 5,943,318
Date of Patent: Aug. 24, 1999

[54] DETECTING DEGRADATION IN TELECOMMUNICATIONS LOCAL LOOP NETWORKS

[75] Inventor: Behzad Badiee, Naperville, Ill.

[73] Assignee: Lucent Technologies Inc., Murray Hill, N.J.

[21] Appl. No.: 08/822,367

[22] Filed: Mar. 20, 1997

[51] Int. Cl.⁶ .......................... G01R 31/08; G06F 11/00; G08C 15/00

[52] U.S. Cl. .......................... 370/248; 370/249; 379/26; 379/27; 371/20.1

[58] Field of Search .................... 370/241–249, 370/226–229, 252, 216, 221, 222; 379/22, 26, 27, 29; 395/181, 182.02, 183.01; 371/20.1, 20.4, 20.5

[56] References Cited

U.S. PATENT DOCUMENTS

| | | | |
|---|---|---|---|
| 5,301,050 | 4/1994 | Czerwiec et al. | 370/249 |
| 5,343,461 | 8/1994 | Barton et al. | 370/249 |
| 5,400,321 | 3/1995 | Nagato | 370/248 |
| 5,425,017 | 6/1995 | Copley et al. | 370/245 |
| 5,553,059 | 9/1996 | Emerson et al. | 370/248 |

*Primary Examiner*—Douglas W. Olms
*Assistant Examiner*—Seema S. Rao

[57] ABSTRACT

An arrangement for monitoring for degraded signals in the loop distribution plant of a telecommunications network. Network interface units (NIUs) are used as an interface between a transmission medium, such as a coax cable or a radio channel, and customer premises equipment. One of these NIUs are assigned an additional task, that of generating up stream performance monitor singals, to be monitored by a centralized performance monitor and control unit, and of monitoring downstream signals to determine their performance characteristics, such as error rate, and to report that performance to the centeralized unit.

13 Claims, 4 Drawing Sheets

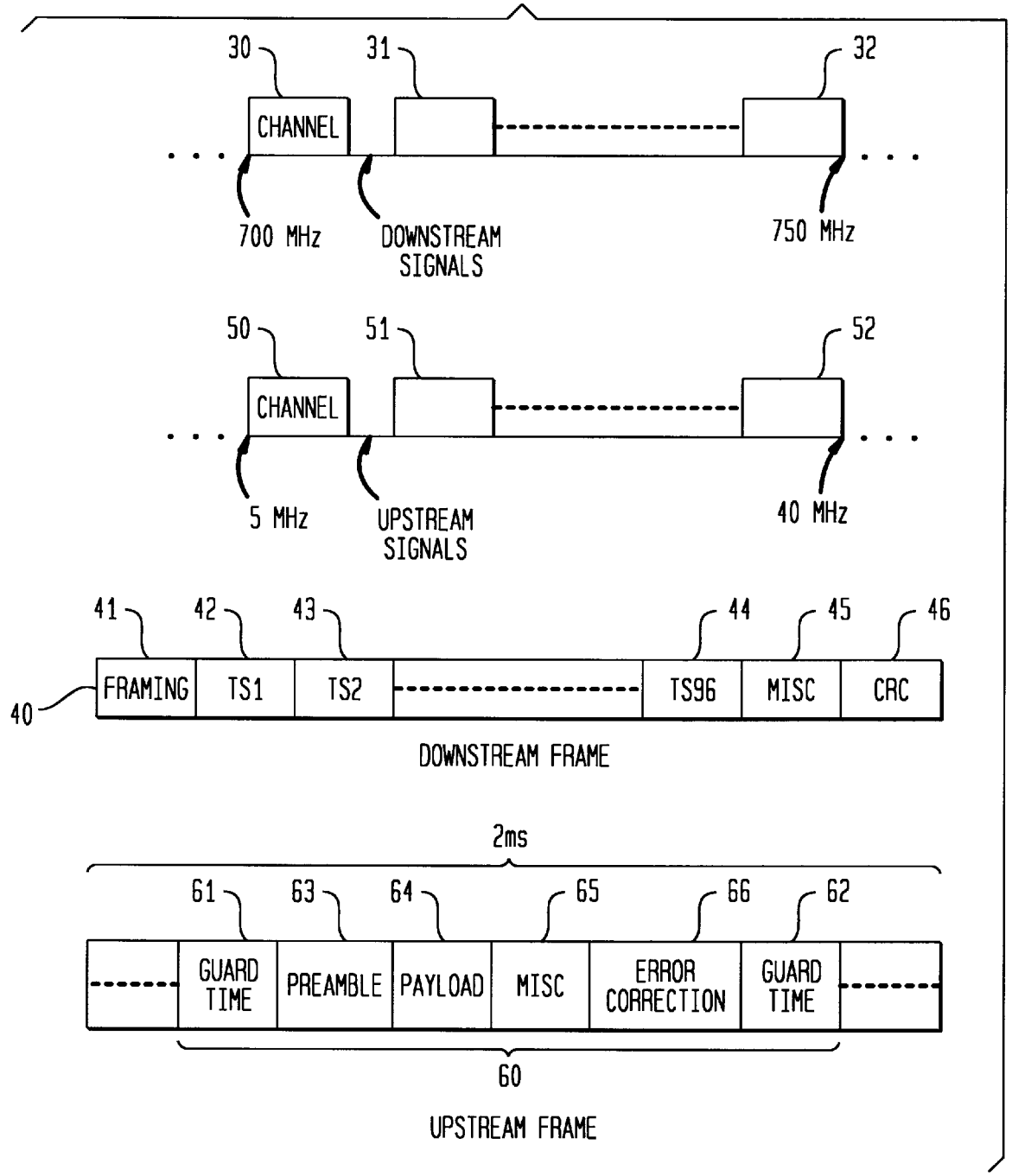

DETECTING DEGRADATION IN TELECOMMUNICATIONS LOCAL LOOP NETWORKS

TECHNICAL FIELDS

This invention relates to monitoring of the performance of the local loop distribution network of broadband telecommunication networks.

PROBLEM

As the need for communicating with telecommunications customers in signals other than voice or voice band data, or other than wire distribution systems, has become increasingly felt, special loop systems are being introduced into the field to distribute signals to the customers. A typical example of such a special loop system is the hybrid fiber/coax system manufactured by Lucent Technologies. This system uses optic fiber communications to reach a cluster of residents and/or businesses. The fiber communications are terminated at a fiber node wherein the optical signals are converted into electrical signals for transmission on a broadcast basis to a group of network interface units (NIUs), each NIU for communicating with the equipment of one customer. Signals, originated from the switch, sent from an interface unit called a host digital terminal (HDT) to the NIU, are referred to herein as downstream signals and are broadcast to all NIUS, each NIU having been set up to select the pertinent downstream channel of the signals. Upstream signals, i.e., signals from the NIU to the HDT are individual for each NIU and are inserted as packets in one or more time division multiplex access time slots of an upstream frame into one of a plurality of frequency separated channels.

The medium which transmits signals from the fiber node to the individual NIUs comprises 4 coax cables each of which can drive a plurality of coax cable segments interconnected in the topology of a tree. Amplification is added as needed, especially at branch points of the tree.

A problem of the prior art is that is it very difficult to monitor the performance of all "paths" of the coax cable tree. A "path" is defined to be a combination of a transmitter, a downstream frequency, an NIU in the downstream direction and a receiver, and upstream frequency and an NIU in the upstream direction. The difficulty arises from the fact that many of these "paths" that are carried over the same physical medium need to be monitored simultaneously. Further, to monitor a signal whose error rate should be less than one error per billion bits requires monitoring of a large number of packets. Another problem is that in the quiescent state, an NIU neither monitors the performance of the downstream signals that it sees nor generates upstream signals for monitoring by the switch.

A similar problem arises in wireless loop distribution systems which have network interface units for interfacing wireless signals with the customer premises equipment; in such systems, downstream signals are not broadcast to all customers, but are sent over channels or subchannels that are individual to each customer.

SOLUTION

The above problem is solved and an advance is made over the prior art in accordance with applicant's invention wherein selected ones of the NIUs are assigned to monitor performance. Each of these performance monitor NIUs (PM-NIUs) constantly monitors the performance of one downstream channel and generates performance monitor upstream traffic for monitoring at the HDT. Since the NIUs as specified by standards are intelligent units controlled by a micro-processor, the addition of the performance monitoring function carries no cost other than the addition of the necessary software at the switch and at the NIU. The PM-NIUs (and other NIUs) transmit results of their performance monitoring measurements to the HDT over their designated upstream channel and time slot. The set of PM-NIUs is generally, but not necessarily, smaller than the set of NIUs of a particular loop system. These upstream channels are synchronized with one downstream channels such that the receivers expect 2.0 millisecond frames during which they expect to receive the upstream traffic. This 2.0 millisecond frame is divided into twenty time slots and every NIU inserts its packet into one of the time slots. Different services call for different packets and some packets occupy more than one time slot.

In accordance with one feature of applicant's preferred embodiment, if insufficient time slots are available to send the upstream performance monitoring traffic as well as the other upstream signals from the NIUs using a particular channel, then the PM-NIU switches the packet type for generating PM-traffic to one that occupies fewer time slots. If still more time slots are needed to carry traffic conventional traffic, this latter PM-traffic can be halted. Advantageously, this effectively allows performance monitoring upstream signals to be normally generated without reducing the bandwidth available for custom traffic.

In accordance with applicant's preferred embodiment the performance monitoring upstream signal uses a four time slot packet instead of the single time slot packet used for the simpler upstream time slots used for conventional traffic; advantageously, this reduces the time required to obtain meaningful upstream performance monitoring measurements.

In accordance with a feature of applicant's preferred embodiment, the upstream PM traffic allows a quantitative analysis to be performed on an upstream channel in a determined way even though the transmission plan for this system allows for bursty traffic on every time slot of a channel.

In accordance with another feature of applicant's invention, the PM-NIU function is assigned to different NIUs at different times. This is done for two purposes. First, in order to cover all branches of the tree the NIUs at the extreme branches are periodically assigned the role of PM-NIU. Second, if the performance measured by a PM-NIU at a specific branch has been degraded, then assignment of the PM-NIU function to an NIU at a branch feeding the degraded branch can help to isolate the problem; this procedure can be iterated until an NIU at an upstream branch measures satisfactory performance.

In applicant's preferred embodiment, the PM-NIUs monitor downstream traffic by monitoring their assigned channel and by checking all of the frames transmitted over that channel before extracting the particular time slot allotted to the PM-NIU. Downstream traffic always has complete frames, even when no customer traffic is being transmitted. In other embodiments wherein the downstream signal is not broadcast to all NIUs, the PM-NIU monitors only a single time slot or other single communication paths which can correspond to an upstream path from the PM-NIU.

Applicant's invention can also be applied to a wireless system using fixed location customer stations, such as that recently proposed by AT&T and described in Business Week, Mar. 10, 1997, page 30. The customer transceivers are the equivalent of NIUs, and the radio link is the equivalent of the branch of the coax cable distribution system that is connected to an NIU; the radio transceivers which use either Time Division Multiplex Access or Code Division Multiplex Access, can use these signals to supply upstream performance monitoring signals; in this case, downstream signals are not broadcast so that a downstream performance monitoring signal can be coupled to an assigned upstream performance monitoring signal.

BRIEF DESCRIPTION OF THE DRAWING

FIG. 2 illustrates the downstream and upstream signals transmitted from the HDT;

DETAILED DESCRIPTION

Figure 1:
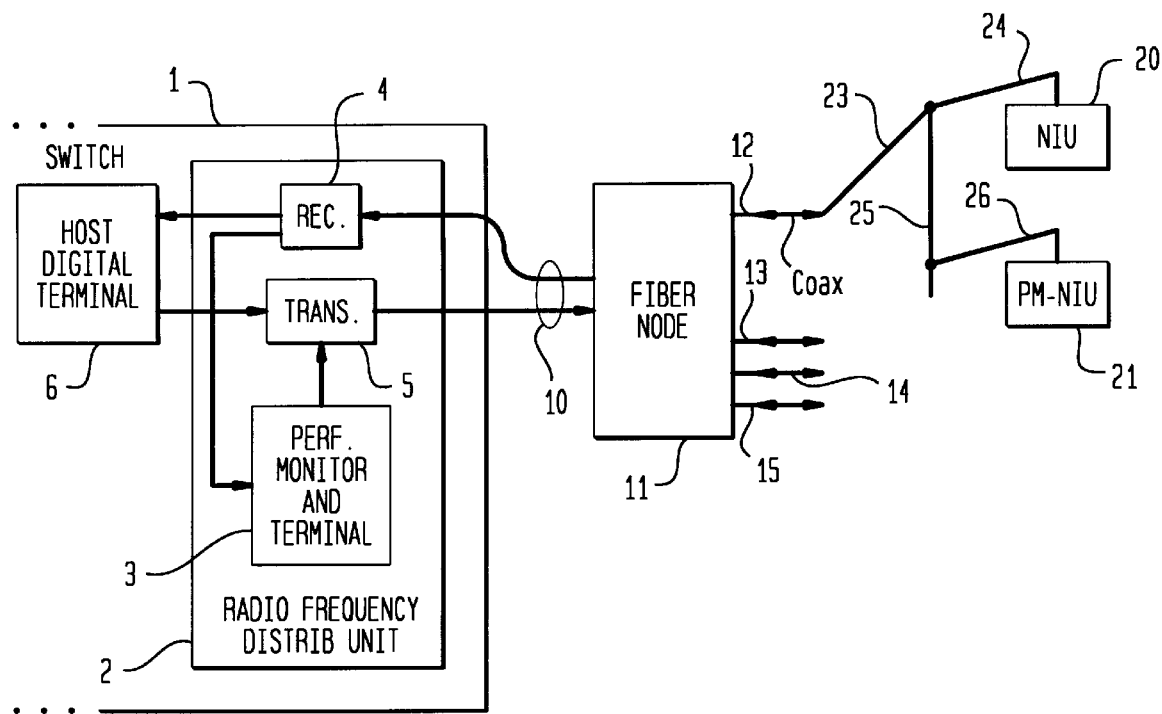
FIG. 1 is a block diagram of one section of a broadband telecommunication local loop network.

The loop plant whose performance is being monitored in accordance with the principles of applicant's invention is connected to a host digital terminal (HDT) 6. This unit is in turn connected to a switch 1. An example of such a switch is the 5ESSE® −2000 switch manufactured by Lucent Technologies Inc. The interface between the loop plant and the HDT is a radio frequency distribution unit 2 such as the radio frequency distribution shelf manufactured by Lucent Technologies, Inc. The radio frequency distribution unit includes a control unit for performance monitoring, the performance monitor and control unit 3. This unit receives signals from receivers 4 and transmits signals to transmitters 5. The receivers and transmitters are also connected to the switching network fabric and other circuits of switch 1.

Receiver 4 and transmitter 5 are connected to a pair of optical fibers 10 (duplicated for reliability, not shown) which terminate at a fiber node 11. The fiber node converts between optical signals transmitted over the fiber pair 10 and electrical signals for transmission in parallel over coaxial cables 12, 13, 14 and 15. Each of these cables receives the same downstream signal from fiber node 11. Fiber node 11 combines upstream signals received in the four coaxial cables in order to generate a combined upstream signal for transmission over the optical fiber pair 10.

Each of the coaxial cables 12, 13, 14, and 15 is at the root of a tree such as the tree connected to coaxial cable 12. This tree comprises a plurality of coaxial cable segments 23, 24, 25, 26, . . . . Attached to each segment are zero or more network interface units such as unit 20 and 21. Between segments of the coaxial cable tree and, if necessary, within some of these segments (including the root segment) is amplification where required. The coaxial cable carries both the upstream and the downstream signals; the upstream and downstream signals occupy a different portion of the frequency spectrum.

Some, but usually less than all of the NIUs perform the function of performance monitoring (PM) as well as the conventional function of interfacing between the coaxial cable and customer equipment. One such NIU is PM-NIU 21 which is shown in greater detail in FIG. 3.

FIG. 2 illustrates the signaling plan for signals upstream and downstream signals carried over coaxial cables 12, 13, 14, 15 and their respective trees. The downstream signals are transmitted in one of 8 channels 30, 31, . . . , 32. Each channel occupies a band in the frequency spectrum between 700 and 750 megahertz. The downstream signal carried in each channel is a continuous set of frames 40, each frame comprising framing bits 41, a series of time slots 42, 43, . . ., 44 for carrying time slots 1, 2, . . . , 96; miscellaneous bits 45 not relevant to applicant's invention, and cyclic redundancy check bits 46 for detecting errors. (The error rate on upstream signals, with channels in the lower portion of the spectrum, is higher so that more error correction is provided for upstream packets.) For broadband services, an NIU may get signals on several time slots; for a narrow band service (such as a basic rate interface ISDN 16 kilobit channel) an NIU may pick a time slot from, for example, every fourth frame.

The upstream signals are carried in a plurality of channels 50, 51, . . . , 52. The channels are in the frequency range between 5 megahertz and 40 megahertz. Upstream signals are sent over a two millisecond frame consisting of a plurality of time slots 60. Each NIU, for the period that it is assigned to transmit continuously, is assigned a frame position within the 2 millisecond frame. The 2 millisecond frame is synchronized through signals carried in the downstream signal stream. Because each of the NIUs transmitting over a particular channel but at different time slots within each 2 millisecond frame cannot be bit synchronized, a guard time 61 and 62 is provided at each end of a time slot. The time slot then has a preamble 63 for synchronizing the bits of the frame, a payload 64 for transmitting the information, miscellaneous information 65 not pertinent to this invention, and error correcting information 66 for correcting errors over the payload and miscellaneous information.

Figure 3:
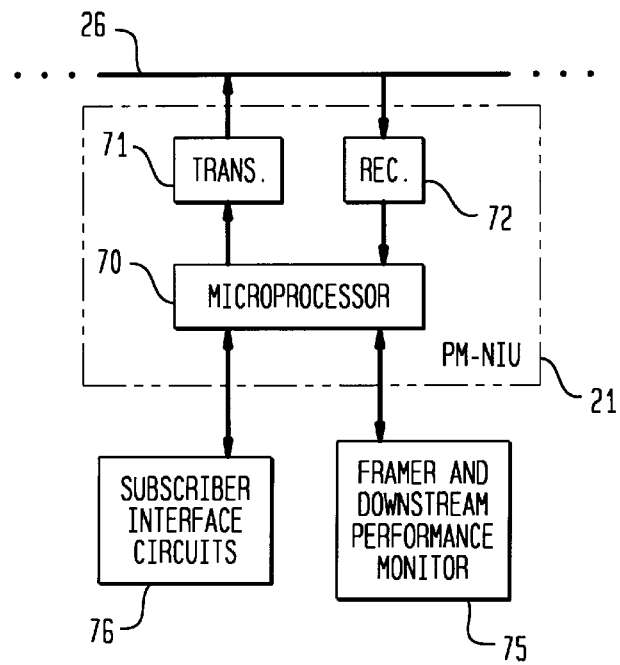
FIG. 3 is a block diagram of a network interface unit (NIU)

FIG. 3 is a block diagram of NIU 21. As previously stated, NIU 21 has been assigned to perform the function of a PM-NIU. This assignment is recorded in the control program and data of the controlling microprocessor 70 of NIU 21. The microprocessor is connected to coaxial cable segment 26 through a transmitter 71 and a receiver 72. The microprocessor causes receive signals to be transmitted to subscriber interface circuits 76 and to framer and downstream performance monitor 75. The unit 75 continuously monitors downstream signals and accumulates performance data for these signals. Periodically microprocessor 70 causes such accumulated data to be transmitted to performance monitor and control unit 3 (FIG. 1). The subscriber interface circuits are also connected via the microprocessor to microprocessor 70 to transmitter 71 to transmit upstream data.

Figure 4:
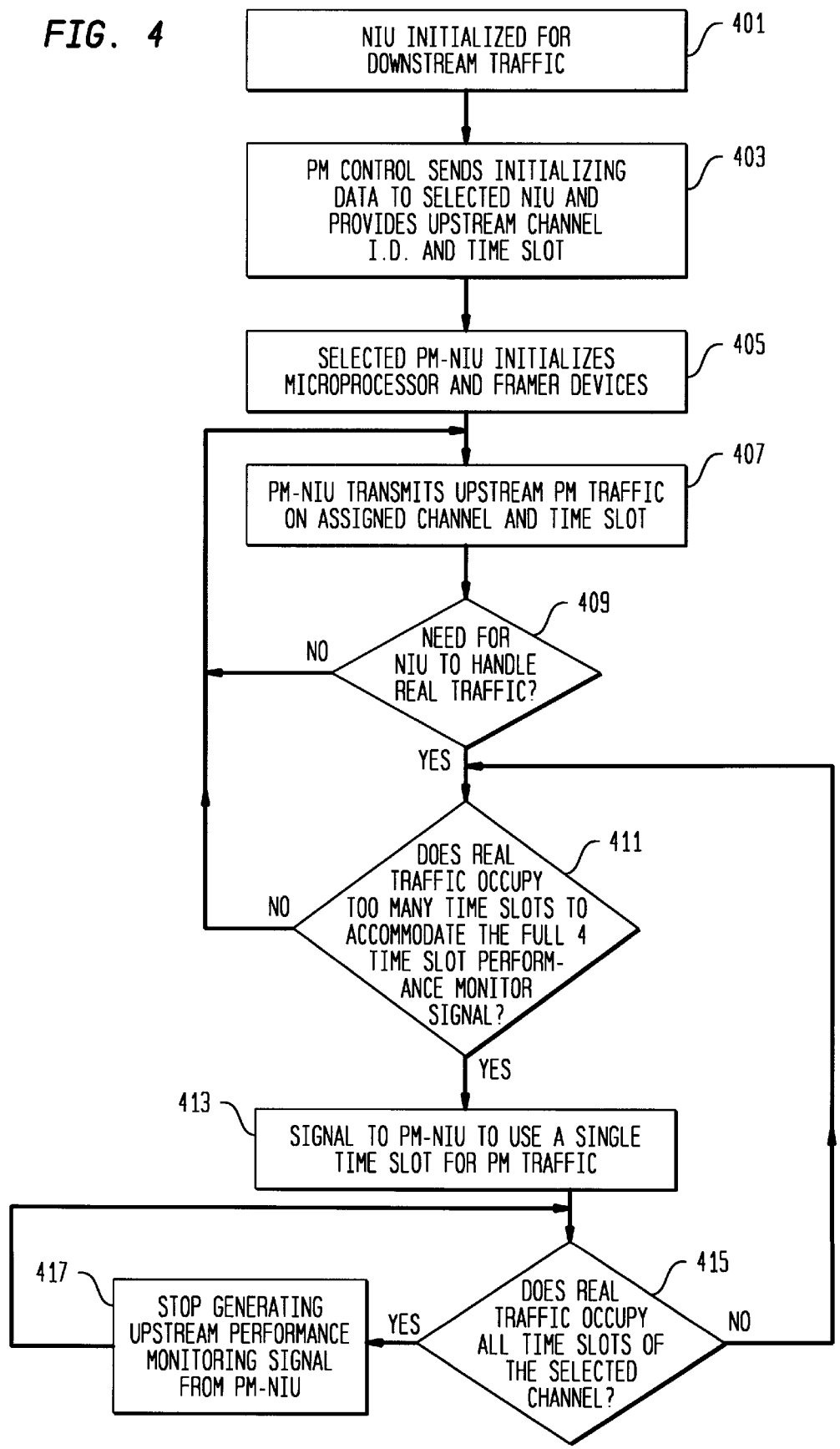
FIG. 4 is a flow diagram illustrating the process of performance monitoring of upstream traffic.

FIG. 4 is a flow diagram illustrating the process of monitoring upstream traffic. An NIU is initialized for receiving downstream traffic over one of the downstream channels (action block 401). The PM control, having made a decision to assign to a particular NIU, the PM-NIU function sends initialization data to the selected PM-NIU and provides the identity of the upstream channel and the time slot on that upstream channel for transmitting performance monitoring frames (action block 403). A selected PM-NIU initializes the microprocessor and framer device to transmit performance monitoring (upstream) traffic and to periodically transmit performance monitoring statistics concerning the downstream traffic (action block 407). Test 411 is performed periodically or when a time slot is added to upstream traffic. It tests whether the channel can still accommodate a full performance monitoring time slot. If the channel can still accommodate a full performance monitoring time slot, then block 407 is re-entered. If the real traffic does occupy so many time slots that a full, four time slot performance monitoring signal cannot be accommodated, then the PM-NIU signals to the performance monitoring control to generate a single time slot performance monitor signal on the selected upstream channel (action block 413). Test 415 then determines whether the channel can no longer accommodate a single performance monitor time slot. If that is the case, the PM-NIU stops transmitting performance monitoring traffic (action block 417). This means that there will be no PM Report for that period of data collection. (The use of real call traffic for PM data collection was deemed inappropriate as such traffic is indeterminate in nature, hence any quantitative analysis of the traffic will be impossible.) Following a reduction or elimination of upstream performance monitoring traffic from a PM-NIU tests 411 and 417 are periodically conducted to see if the real traffic still occupies all of the time slots of the selected upstream channel. If this is no longer the case, then one of action blocks 407 or 413, previously described, is re-entered.

Figure 5:
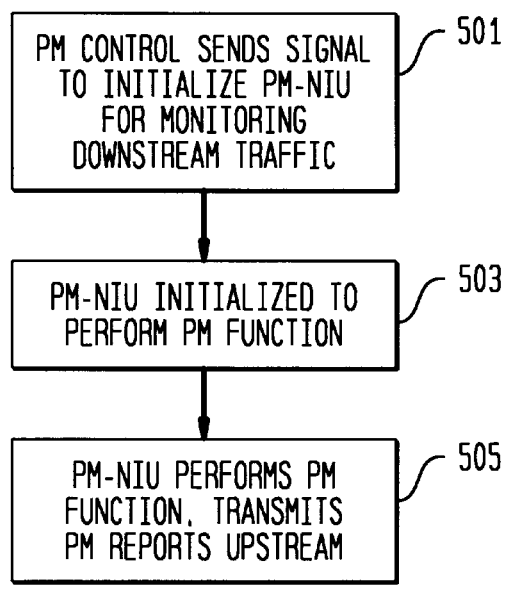
FIG. 5 is a flow diagram illustrating the performance monitoring of downstream traffic.

FIG. 5 illustrates the downstream monitoring procedure. The performance monitoring control send signals to initialize PM-NIU for monitoring downstream traffic (action block 501). In response to these signals the PM-NIU is initialized to perform the PM function (action block 503). The PM-NIU then performs performance monitoring on downstream traffic and periodically transmits performance monitoring reports upstream (action block 505). The use of the same PM-NIU for monitoring downstream traffic and generating PM upstream traffic is advantageous; it saves power because no separate unit has to be taken out of the quiescent state to monitor downstream traffic.

Figure 6:
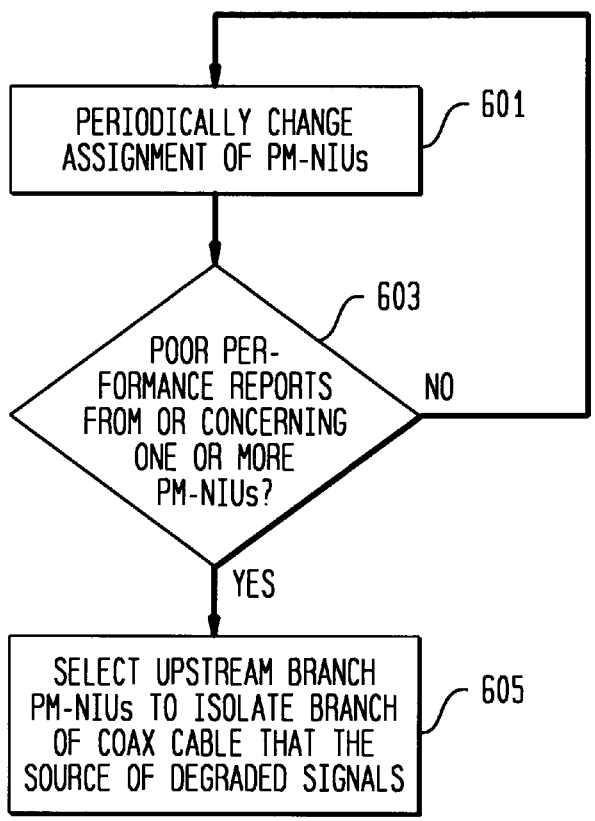
FIG. 6 is a flow diagram illustrating the assignment of different NIUs to the PM-NIU function.

FIG. 6 illustrates the process of using different PM-NIUs to check the loop system at different times. The number of PM-NIUs which are active at any one time is limited by three factors. Each receiver, and there is one receiver per upstream channel, can only monitor upstream traffic from one PM-NIU. Secondly, the performance monitoring upstream signal occupies approximately 20% of a channel so that there is inadequate capacity, practically speaking, for monitoring more than one PM-NIU per channel. Finally, since the power is supplied over the coax cable, and a PM-NIU uses substantially more power to perform its function than does a quiescent NIU, there are power limitations which limit the number of PM-NIUs which can be active at any one time.

In order to check all branches of the trees the performance monitor control periodically changes the assignment of PM-NIUs (action block 601).

In the preferred embodiment, the performance monitor control maintains data describing the topology of the distribution network, and the location of NIUs on the network. Alternatively or additionally, control of changes of assignment of PM-NIUs can be directed by the maintenance personnel.

Applicant's invention can also be applied to a wireless system using fixed location customer stations, such as that recently proposed by AT&T and described in Business Week, Mar. 10, 1997, page 30. The customer transceivers which use either Time Division Multiplex Access or Code Division Multiplex Access, can use these signals to supply upstream performance monitoring signals; in this case, downstream signals are not broadcast so that a downstream performance monitoring signal can be coupled to an assigned upstream performance monitoring signal.

For this application, the performance monitor and control unit is advantageously associated with a switch. For this application, it is especially desirable to switch assignment of the PM-NIU function among different customer transceivers, because these transceivers and the RF channels are the main units being monitored for degraded performance. Test 603 is used to determine whether there are any poor performance reports being received from one or more PM-NIUs. If so, then the performance monitor control or some other unit such as an operations support system selects upstream branches of the PM-NIUs from which degraded upstream signals had been received or which have reported degraded downstream signals in order to isolate the branch or branches on which degraded signals appear to be present.

Many other arrangements can be derived by those of ordinary skill in the art without departing from the scope of the invention. The invention is therefore only limited by the attached claims.

I claim:

1. In a telecommunications loop system using NIUs (Network Interface Units) to interface between a loop distribution medium and customer stations, a method of checking for degradation of the performance of the loop distribution paths, comprising the steps of:

from a performance monitoring controller for detecting marginal conditions, assigning ones of said NIUs to perform a PM (performance monitoring for detecting marginal conditions) function;

transmitting PM signals upstream from the PM-NIUs for monitoring at a centralized location; and monitoring said PM signals at said centralized location to measure performance; wherein said loop system is a point to multi-point system;

wherein a first PM-NIU that is located upstream from a second PM-NIU, checks a different portion of the loop system than the second PM-NIU.

2. In a telecommunication system using fixed location wireless NIU (network interface units) to interface between an antenna of a loop distribution system and a customer station, a method of checking for degradation of the performance of the loop distribution system, comprising the steps of:

from a performance monitoring controller for detecting marginal conditions, assigning ones of said NIUs to perform a PM (performance monitoring for detecting marginal conditions) function;

transmitting PM signals upstream from the PM-NIUs for monitoring at a centralized location; and monitoring said PM signals at said centralized location to measure performance;

wherein said telecommunication system is a point to multi-point system;

wherein a first PM-NIU that is located upstream from a second PM-NIU checks on a different portion of the loop system than the second PM-NIU.

3. The method of claim 1 or 2 wherein said ones of said NIUs for performing a PM function, are fewer than all of said NIUs.

4. The method of claim 3 further comprising the steps of:
monitoring downstream signals at said PM-NIUs; and
transmitting periodic performance reports from said PM-NIUs to said centralized location.

5. The method of claim 4 wherein the step of monitoring downstream signals comprises the step of monitoring broadcast downstream signals.

6. The method of claim 4 wherein the step of monitoring downstream signals comprises the step of monitoring downstream signals directed only to a PM-NIU.

7. The method of claim 3 wherein a different upstream PM signal is generated by a PM-NIU when there is heavy upstream traffic than where there is light upstream traffic.

8. The method of claim 3 wherein no upstream PM signal is generated by a PM-NIU if upstream traffic is sufficiently heavy.

9. The method of claim 3 further comprising the step of: changing the assignment of NIUs to perform the PM function.

10. The method of claim 9 wherein the step of changing the assignment comprises the step of:

changing the assignment periodically.

11. The method of claim 9 wherein the step of changing the assignment comprises the step of:

changing the assignment in response to receipt of degraded PM upstream signals.

12. The method of claim 9 wherein the step of changing the assignment comprises the step of:

changing the assignment in response to commands received from maintenance personnel.

13. The method of claim 3 wherein the step of assigning further comprises the step of:

signaling to said ones of said NIUs to initialize them to perform said PM function.

* * * * *